US007349459B2

(12) United States Patent
Brunel (10) Patent No.: US 7,349,459 B2
(45) Date of Patent: Mar. 25, 2008

(54) MULTIUSER DETECTION METHOD AND DEVICE IN DS-CDMA MODE

(75) Inventor: Loic Brunel, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1085 days.

(21) Appl. No.: 10/014,899

(22) Filed: Dec. 14, 2001

(65) Prior Publication Data

US 2002/0114410 A1    Aug. 22, 2002

(30) Foreign Application Priority Data

Dec. 20, 2000   (FR)   .................................. 00 17071

(51) Int. Cl.
*H04B 1/00* (2006.01)
(52) U.S. Cl. ........................................... 375/144
(58) Field of Classification Search ............... 375/144, 375/264, 299, 150, 242, 224
See application file for complete search history.

(56) References Cited

U.S. PATENT DOCUMENTS

| 5,297,170 | A |   | 3/1994  | Eyuboglu et al. |          |
|-----------|---|---|---------|-----------------|----------|
| 5,309,481 | A | * | 5/1994  | Viviano et al.  | 375/344  |
| 5,444,712 | A | * | 8/1995  | Betts et al.    | 370/207  |
| 5,541,964 | A | * | 7/1996  | Cohen et al.    | 375/285  |
| 5,790,588 | A | * | 8/1998  | Fukawa et al.   | 375/148  |
| 5,831,984 | A | * | 11/1998 | Hottinen        | 370/441  |
| 5,835,731 | A | * | 11/1998 | Werner et al.   | 375/235  |
| 6,161,209 | A | * | 12/2000 | Moher           | 714/780  |
| 6,181,729 | B1| * | 1/2001  | O'Farrell       | 375/130  |
| 6,240,099 | B1| * | 5/2001  | Lim et al.      | 370/441  |
| 6,259,743 | B1| * | 7/2001  | Garth           | 375/261  |

(Continued)

FOREIGN PATENT DOCUMENTS

DE    196 30 391    7/1997

(Continued)

OTHER PUBLICATIONS

[1999 IEEE 0-7803-5268-Aug. 1999] Brunel et al., Euclidean Space Lattice Decoding for Joint Detection in CDMA Systems, 1999 IEEE ITW, Kruger National Park, South Africa, Jun. 20-25, 1999, p. 129.*

(Continued)

*Primary Examiner*—Jean B. Corrielus
(74) *Attorney, Agent, or Firm*—Oblon, Spivak, McClelland, Maier & Neustadt, P.C.

(57) ABSTRACT

A method and device for processing a received signal by detecting within the received signal a plurality of possible symbols transmitted by or for a plurality K of users, each of the plurality of possible symbols belonging to a modulation constellation and being the subject of a spectral spreading by a spreading sequence. The step of detecting includes sub-steps of: a) filtering the received signal by supplying a complex vector characteristic of the received signal and decomposing the complex vector into real and imaginary vectors; b) separately searching for a closest neighbor of the real vector and a closest neighbor of the imaginary vector within a respective real and imaginary lattice of points corresponding to the modulation constellation; and c) estimating the transmitted symbols from components of the closest neighbor of the real vector and the closest neighbor of the imaginary vector to produce a vector of estimated symbols.

15 Claims, 5 Drawing Sheets

U.S. PATENT DOCUMENTS

| | | | | |
|---|---|---|---|---|
| 6,263,013 | B1* | 7/2001 | Hendrickson | 375/150 |
| 6,301,293 | B1* | 10/2001 | Huang et al. | 375/130 |
| 6,301,315 | B1* | 10/2001 | Li | 375/346 |
| 6,377,631 | B1 | 4/2002 | Raleigh | |
| 6,490,318 | B1* | 12/2002 | Larsson et al. | 375/232 |
| 6,594,319 | B1* | 7/2003 | Shaikh | 375/265 |
| 6,654,365 | B1* | 11/2003 | Sylvester et al. | 370/342 |
| 6,798,758 | B1* | 9/2004 | Chun et al. | 370/335 |
| 6,801,579 | B1 | 10/2004 | Hassibi et al. | |
| 6,987,800 | B2* | 1/2006 | Nordstrom et al. | 375/220 |
| 2001/0017881 | A1* | 8/2001 | Bhatoolaul et al. | 375/130 |
| 2001/0050948 | A1* | 12/2001 | Ramberg et al. | 375/148 |
| 2002/0072336 | A1* | 6/2002 | Mottier | 455/101 |
| 2003/0012269 | A1* | 1/2003 | Kanemoto et al. | 375/150 |

FOREIGN PATENT DOCUMENTS

| | | |
|---|---|---|
| EP | 0 465 851 | 1/1992 |

OTHER PUBLICATIONS

[1996 IEEE 0-7803-3567-Aug. 1996] Schnell et. al., Diversity Considerations for MC-CDMA Systems in Mobile Communications, 1996 IEEE ICT, German Aerospace Research Establishment, Webling, Germany, pp. 131-135.*

[1999 IEEE 0018-9448/99] Viterbo et al., A Universal Lattice Code Decoder for Fading Channels, 1999 IEEE Transactions on Information Theory, vol. 45 No. 5, Jul. 1999, pp. 1639-1642.*

[1989 IEEE 0018-9448/89] Lupas et al., Linear Multiuser Detectors for Synchronous Code-Division Multiple-Access Channels, 1989 IEEE Transactions on Information Theory, vol. 35, No. 1, Jan. 1999, pp. 123-136.*

[1988 IEEE 0018-9448/88] Adoul et al., Nearest Neighbor Algorithm for Spherical Codes from the Leech Lattice, IEEE Transactions on Information Theory, vol. 34, No. 5, Sep. 1988, pp. 1188-1202.*

[1999 IEEE 0-7803-5599-Jul. 1999] Song et al., Subspace Blind Detection of Asynchronous CDMA Signals in Multipath Channels, pp. 21-24.*

[2000 IEEE 0-7803-5857-0/00] Damen et al., Sphere Decoding of Space-Time Codes, Jun. 25-30, 2000, ISIT 2000, Sorrento, Italy, p. 362.*

[1990 IEEE 0733-8716/90] Kohno et al., Combination of an Adaptive Array Antenna and a Canceller of Interference for Direct-Sequence Spread-Spectrum Multiple-Access System, IEEE Journal on Selected Areas in Communications, vol. 8 No. 4, May 1990, pp. 675-682.*

[1999 IEEE 0-7803-5268-Aug. 1999] Brunel et al., Euclidean Space Lattice Decoding for Joint Detection in CDMA Systems, 1999 IEEE ITW, Kruger National Park, South Africa, Jun. 20-25, 1999, p. 129.*

[1996 IEEE 0-7830-3567-Aug. 1996] Schnell et. al., Diversity Considerations for MC-CDMA Systems in Mobile Communications, 1996 IEEE ICT, German Aerospace Research Establishment, Webling, Germany, pp. 131-135.*

[1999 IEEE 0018-9448/99] Viterbo et al., A Universal Lattice Code Decoder for Fading Channels, 1999 IEEE Transactions on Information Theory, vol. 45 No. 5, Jul. 1999, pp. 1639-1642.*

[1989 IEEE 0018-9448/89] Lupas et al., Linear Multiuser Detectors for Synchronous Code-Division Multiple-Access Channels, 1989 IEEE Transactions on Information Theory, vol. 35, No. 1, Jan. 1999, pp. 123-136.*

U. Fawer, et al., Proceedings of the Military Communications Conference (MILCOM), IEEE, vol. 3, pp. 977-981, XP-000506005, "Multiuser Reception for Trellis-Based Code Division Multiple Access Communications", Oct. 2-5, 1994.

Shinsuke Hara et al, "Overview of Multicarrier CDMA," IEEE Communications Magazine, Dec. 1997, pp. 126-133.

Nathan Yee et al, "Multi-Carrier CDMA in Indoor Wireless Radio Networks," PIMRC' 93, The Fourth International Symposium on Personal, Indoor and Mobile Radio Communications, Communications- the bridge to the future, Sep. 8-11, 1993.

Stefan Kaiser et al, "Multi-Carrier CDMA with Iterative Decoding and Soft-Interference Cancellation," IEEE, Aug. 1997, pp. 6-10.

S. Nahm, et al., IEEE GLEBECOM 1996, XP-000748718, vol. 3, pp. 1583-1587, "Time-Domain Equalization for the Orthogonal Multi-Carrier CDMA System", Nov. 18, 1996.

J.F. Helard, et al., Electronics Letters, XP-000936982, vol. 36, No. 7, p. 665, "Linear MMSE Detection Technique for MC-CDMA", Mar. 30, 2000.

P. Jung, et al. Frequenz, XP-000765910, vol. 51, No. 11/12, pp. 270-275, "A Generalized View on Multicarrier CDMA Mobile Radio Systems With Joint Detection (Part II)", Nov. 1, 1997.

A. Klein, et al., PIMRC'92, The Third IEEE International Symposium on Personal, Indoor and Mobile Radio Communications (Cat. No. 92TH0488-7), pp. 118-122, "Simultaneous Cancellation of Cross Interference and ISI in CDMA Mobile Radio Communications", Oct. 19-21, 1992.

* cited by examiner

BACKGROUND ART

FIG.1

BACKGROUND ART

MULTIUSER DETECTION METHOD AND DEVICE IN DS-CDMA MODE

TITLE OF THE INVENTION

Multi detection method and device in DS-CDMA mode

BACKGROUND OF THE INVENTION

1. Field of the Invention

The present invention concerns a multiuser detection method and device. More particularly, the present invention concerns a maximum likelihood multiuser detection method and device for a DS-CDMA (Direct Sequence Code Division Multiple Access) telecommunication system.

2. Description of the Related Art

In a DS-CDMA mobile telecommunication system, the separation of the communications coming from or going to the different users is achieved by multiplying each complex symbol of a user by a spreading sequence which is peculiar to him, also referred to for this reason as the user signature. The spreading frequency (chip rate) being greater than the frequency of the symbols, the signal transmitted by each user is distributed (or spread) in the space of the frequencies. The ratio between the band occupied by the spread signal and the band occupied by the information signal is referred to as the spreading factor. On reception, the separation of a given user is obtained by means of a filtering adapted to the corresponding signature. When the transmission channel has a plurality of propagation paths, the output of the adapted filtering contains as many correlation peaks. Each path of the channel can be modelled by a complex multiplicative coefficient and a delay. The signals being propagated along the different paths can be aligned and combined by means of complex coefficients which are conjugates of the path coefficients, thus effecting a filtering adapted to the transmission channel. In order to simplify the terminology, the general expression "filtering adapted to the user k" will encompass both the filtering operation adapted to the signature of the user k and the filtering operation adapted to the transmission channel.

To combat the interference between signals destined for (the downlink) or coming from (the uplink) the different users, multiuser detection methods have been proposed, and notably iterative detection methods such as those known as PIC (*Parallel Interference Cancellation*) and SIC (*Serial Interference Cancellation*). They are based on the iteration of an interference elimination cycle including the estimation of the symbols transmitted, the evaluation of the interferences and their subtraction from the signals received. Although of high performance, these methods are not optimal since they do not provide an estimation in the sense of the maximum likelihood of the symbols transmitted by the different users.

A method of multiuser detection with maximum likelihood inspired by the Viterbi algorithm was proposed by S. Verdu in an article entitled "Minimum probability of error for asynchronous Gaussian multiple access channels", published in IEEE Transactions on Information Theory, pages 85-96, January 1986, but its complexity is prohibitive since it varies exponentially with the number of users.

More recently a method of multiuser detection with maximum likelihood using a representation by a lattice of points was proposed by L. Brunel et al., in an article entitled "Euclidian space lattice decoding for joint detection in CDMA system" published in Proceedings of ITW, page 129, June 1999. According to this method, a vector characteristic of the received signal representing a statistic sufficient for the maximum likelihood detection of the symbols transmitted by the different users is determined. It is shown under certain conditions that the characteristic vector can be represented as the point in a lattice disturbed by a noise. The detection then consists of seeking the point in the lattice closest to the point corresponding to the vector received. However, the dimension of the lattice to be used generally being 2.K or K where K is the number of users, the number of points to be tested is still very high. To simplify detection, it has been proposed to limit the search for the closest neighbour to the points in the lattice belonging to a sphere centred around the point received. This simplified detection method, referred to as the "method of detection by spheres", will be disclosed below:

The context is a multiple access mobile telecommunication system with direct sequence spectrum spreading (DS-CDMA) comprising K users communicating synchronously with a base station.

Let $d_k(i)$ be the complex symbol sent by the user k at instant i. This symbol belongs to the modulation constellation $A_k$ used by the user k, which will also be referred to as the alphabet of symbols of the user k.

Each user k transmits a block of N symbols with an amplitude of the signal $a_k$. The symbols are spread by a complex signature $s_k(t) = s_k^R(t) + j \cdot s_k^I(t)$ with a duration equal to the symbol period T:

$$s_k(t) = 0 \text{ if } t \notin [0,T]$$

The K complex symbols $d_k(i) = d_k^R(i) + j \cdot d_k^I(i)$ transmitted at instant i are placed in a row vector of real values $d_2(i)$ defined as:

$$d_2(i) = (d_1^R(i), \ldots, d_K^R(i), d_K^R(i), d_K^I(i)) \tag{1}$$

Because of the synchronisation of the users, the corresponding modulated signal can be written, as a function of the time t:

$$S_t = \sum_{i=0}^{N-1} \sum_{k=1}^{K} a_k d_k(i) s_k(t - iT) \tag{2}$$

It is assumed that the channel is an ideal channel with white additive Gaussian noise. Let $r_t = S_{t+\eta_t}$ be the signal received at time t and $\eta_t$ a complex Gaussian noise of zero mean whose components have a variance $N_0$.

Let the row vectors be $y(i) = (y_1(i), \ldots, y_K(i))$ and $y_2(i) = (y_1^R(i) y_1^I(i), \ldots, y_K^R(i), y_K^I(i))$ where $y_k(i) = y_k^R(i) + j \cdot y_k^I(i)$ is the complex output at instant i of the filter adapted to the user k:

$$y_k(i) \triangleq \int_{-\infty}^{+\infty} s_k^*(t - iT) r_t dt \tag{3}$$

$$= \sum_{l=1}^{K} a_l d_l(i) \int_0^T s_l(t) s_k^*(t) dt + n_k(i)$$

$$= \sum_{l=1}^{K} a_l d_l(i) R_{lk} + n_k(i)$$

with $$R_{lk} = \int_0^T s_l(t)s_k^*(t)dt = R_{lk}^R + j \cdot R_{lk}^I \text{ for } k, l = 1, \ldots, K \quad (3)$$

and $$n_k(i) = \int_0^T \eta_i \cdot s_k^*(t - i \cdot T)dt$$

The autocorrelation matrix of the spreading sequences will be denoted R(i).

If the complex elements of (3) are decomposed into their real and imaginary parts, there is obtained:

$$[y_k^R(i) + j \cdot y_k^I(i)] = \sum_{l=1}^K a_l[b_l^R(i)R_{lk}^R - b_l^I(i)R_{lk}^I] + \qquad (4)$$

$$j \cdot \sum_{l=1}^K a_l[b_l^R(i)R_{lk}^I + b_l^I(i)R_{lk}^R] + [n_k^R(i) + j \cdot n_k^I(i)]$$

Let $._2$=Diag($a_1, a_1, \ldots, a_K, a_K$) and $R_2$ be the matrix of size 2K×2K such that:

$$R_2 = \begin{bmatrix} R_{11}^R & R_{11}^I & \cdots & R_{1K}^R & R_{1K}^I \\ -R_{11}^I & R_{11}^R & \cdots & -R_{1K}^I & R_{1K}^R \\ \vdots & \vdots & & \vdots & \vdots \\ R_{KI}^R & R_{KI}^I & \cdots & R_{KK}^R & R_{KK}^I \\ -R_{KI}^I & R_{KI}^R & \cdots & -R_{KK}^I & R_{KK}^R \end{bmatrix} \quad (5)$$

Equation (4) can then be put in matrix form:

$$y_2(i) = d_2(i)M_2 + n_2(i) \quad (6)$$

where $M_2$ is a real matrix of size 2K×2K defined by $M_=A_2R_2$ and where the noise vector $n_2(i)=(n_1^R(i), n_1^I(i), \ldots, n_K^R(i), n_K^I(i))$ has $N_0R_2$ as its covariance matrix.

It will be demonstrated below that $y_2(i)$, as given by equation (6), can be represented as a point in a lattice $\Lambda_2$ of dimension 2.K, with a generator matrix $M_2$ corrupted by a noise $n_2$.

The term real lattice of points $\Lambda$ of dimension κ will be used for any set of vectors of R. satisfying:

$$x = b_1v_1 + b_2v_2 + \ldots + b.v. \text{ where } b_i \in Z, \forall i=1, \ldots, \kappa$$

and where $\{v_1, v_2, \ldots, v\kappa\}$ is a base on $R^\kappa$.

Figure 1:
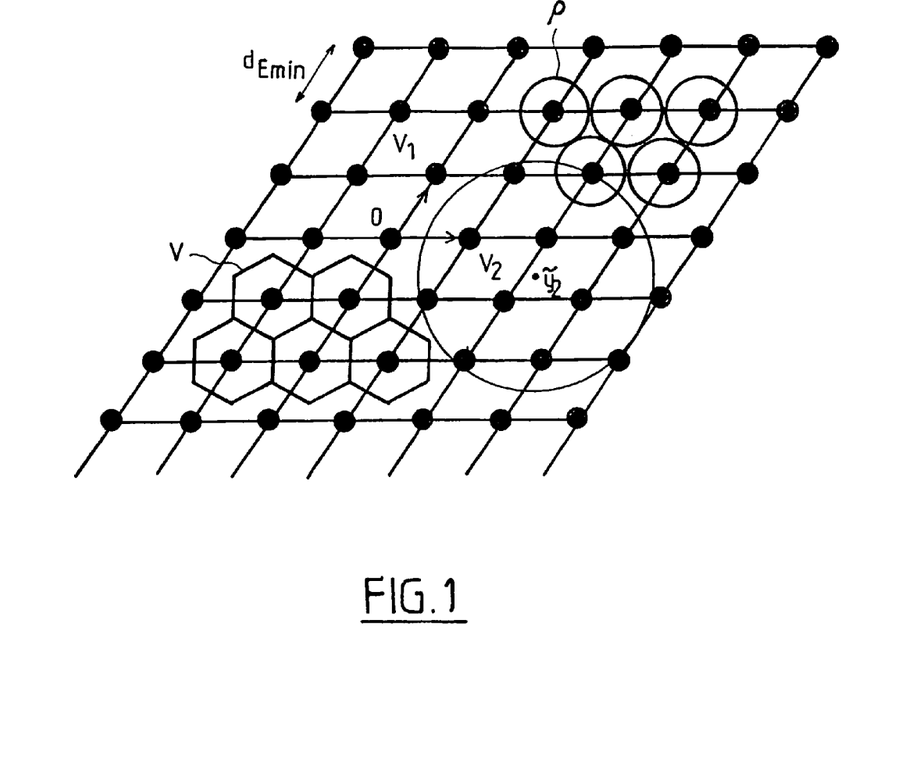
FIG. 1 depicts a lattice of points useful to the detection method employed in the receiver illustrated in FIG. 2.

An example of a lattice of points of dimension 2 has been shown in FIG. 1.

The points in the lattice form an additive abelian sub-group of R., and it is also the smallest sub-group of $R^\kappa$ containing the vectors $\{v_1, v_2, \ldots, v_\kappa\}$ and a Z-modulus of $R^\kappa$. These base vectors form the rows of the generator matrix G for the lattice. It is therefore possible to write $$x = bG \text{ where } b = (b_1, \ldots b_k) \in Z^\kappa. \quad (7)$$

The region delimited by the base vectors is referred to as the fundamental parallelotope and its volume, denoted vol ($\Lambda$) and det($\Lambda$), is referred to as the fundamental volume.

This fundamental volume is none other than the modulus of the vectorial product of the κ base vectors and is therefore equal to |det(G)| where det designates the determinant. Though there are several possible choices for the generator matrix for the same lattice, on the other hand there is only one value for the fundamental volume.

The Voronoi region V or Dirichlet cell of a point x belonging to the lattice is all the points of $R^K$ closer to x than any other point in the lattice. The volume of this region is equal to the fundamental volume.

The stacking radius ρ of the lattice is the radius of the largest sphere inscribed in the Voronoi region and the radius of coverage that of the smallest sphere circumscribed in this same region. The stacking radius is therefore the radius of the spheres whose stacking constitutes the lattice of points and the radius of coverage is that of the smallest spheres which, centred on the points in the lattice, make it possible to cover the entire space $R^\kappa$. The density of the lattice is the ratio between the volume of the sphere of radius ρ and the fundamental volume. Finally, the coefficient of error (the kissing number) τ(Λ) of the lattice is the number of spheres tangent to one and the same sphere in the stack or, in other words, the number of neighbors of a point in the lattice, situated at the minimum distance $d_{Emin}=2\rho$.

Consider once again equation (6). The complex numbers $d_k^R(i)+j.d_k^I(i)$ belong to a finite alphabet (or constellation) A of cardinal:

$$\text{Card}(A) = \prod_{K=T}^K \text{Card}(A_k) \quad (8)$$

Assume for example that the components $d_k^R(i)$ and $d_k^I(i)$ are PAM modulation symbols of order M:

$$d_k^R(i) \in \{-M+1, -M+3, \ldots, M-3, M-1\} \quad (9)$$

and $$d_k^I(i) \in \{-M+1, -M+3, \ldots, M-3, M-1\} \quad (10)$$

If the transformation is effected:

$$d_k'^R(i) = \frac{1}{2}(d_k^R(i) + M - 1) \quad (11)$$

and $$d_k'^I(i) = \frac{1}{2}(d_k^I(i) + M - 1)$$

or again vectorially:

$$d_2'(i) = \frac{1}{2}(d_2(i) + v_M)$$

where $v_M=(M-1, M-1, \ldots, M-1)$ the components $d'_k^R(i)$ and $d'_k^I(i)$ are elements of Z and consequently $d'_2(i)$ is a vector of $Z^{2K}$.

In general terms, if there exists an affine transformation transforming the components $d_k^R(i)$ and $d_k^I(i)$ into elements of Z, the vector $d'_2(i)$ can be represented by a vector of $Z^{2K}$.

In a similar manner, the corresponding transformation is effected on $y_2(i)$, that is to say:

$$y'_2(i) = \frac{1}{2}(y_2(i) + v_M M_2) \quad (12)$$

By means of this transformation, which is assumed to be implicit hereinafter, the vector $d_2(i)M_2$ then belongs to a lattice of points $\Lambda_2$ of dimension 2.K as defined by equation (7) with $G=M_2$. The vector $y_2(i)$ can then be considered to be a point in the lattice $\Lambda_2$ corrupted by a noise $n_2(i)$.

If it is assumed that the components of the noise vector $n_2(i)$ are centred independent random Gaussian variables, the problem of detection in the sense of the maximum likelihood of the symbols transmitted by the different users amounts to a search for the point $z_2$ in the lattice $\Lambda_2$ such that its distance to $y_2(i)$ is at a minimum.

In reality, the components of the noise vector $n_2(i)$ are correlated and the covariance matrix of $n_2(i)$ is $N_0 R_2$.

In order to boil down to the decorrelated case it is necessary, prior to the decoding, to effect an operation of whitening of the noise.

The matrix R being hermitian, the autocorrelation matrix $R_2$ is symmetrical defined positive and can therefore be the subject of a Cholesky factorisation:

$$R_2 = W_2 W_2^T \quad (13)$$

where $W_2$ is an inferior triangular matrix of size 2K×2K.

A whitened observation vector is defined:

$$\tilde{y}_2(i) = y_2(i) W_2^{T^{-1}} \quad (14)$$

and a new lattice of points $\Omega_2$ consisting of vectors of components $(\tilde{x}_1^R(i), \tilde{x}_1^I(i), \ldots, \tilde{x}_K^R(i), \tilde{x}_K^I(i))$ with $\tilde{x}_2(i) = x_2(i) W_2^{T^{-1}}$ where $x_2(i)$ is a vector of components $(x_1^R(i), x_1^I(i), \ldots, x_K^R(i), x_K^I(i))$ belonging to $\Lambda_2$.

It can easily be shown that, after whitening, the covariance matrix of the filtered noise $n_2(i) W_2^{T^{-1}}$ is equal to $N_0 I_{2K}$ where $I_{2K}$ is the identity matrix of dimension 2K. The detection therefore comprises a first step of whitening the observation vector followed by a step of seeking the closest neighbour within the lattice of points $\Omega_2$.

In order to reduce the number of points to be tested, as illustrated in FIG. 1, it is possible to limit the search to a sphere centred around the point $\tilde{y}_2$. In practice, the choice of the radius of the sphere results from a compromise: it must not be too large in order not to lead to an excessively high number of points and sufficiently large to include at least the closest neighbour.

Figure 2:
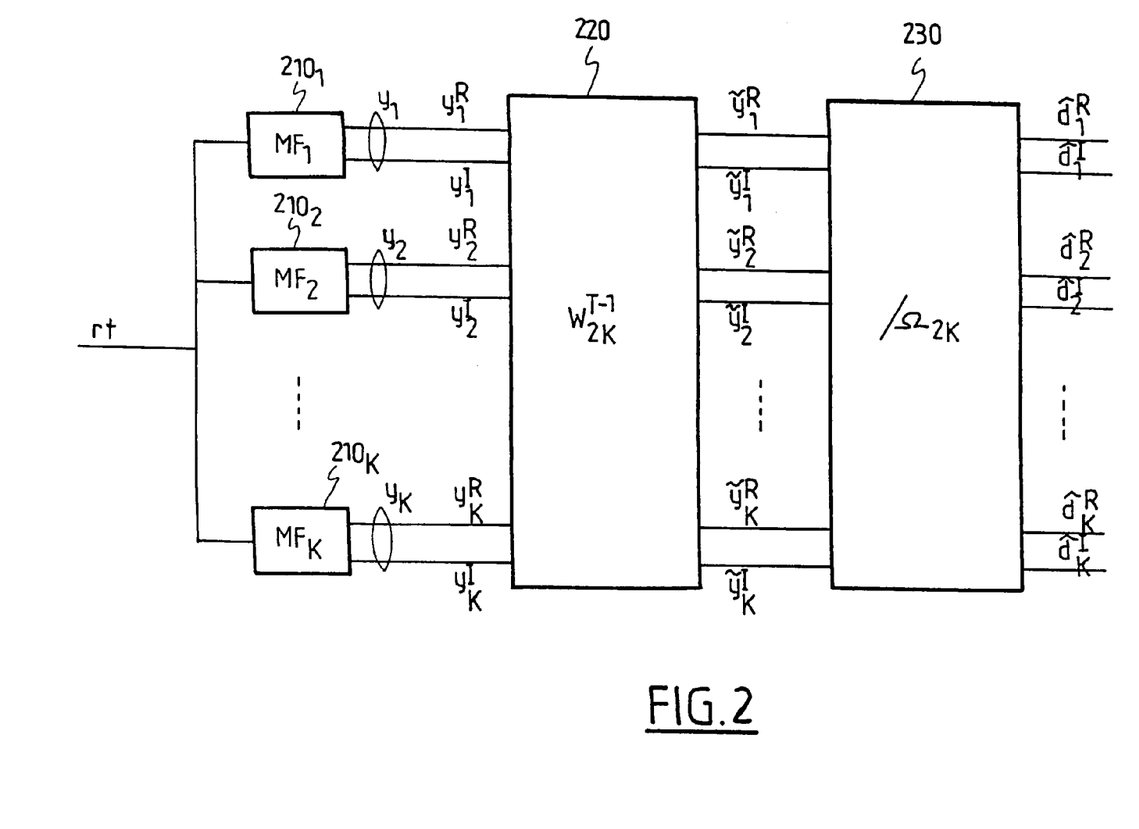
FIG. 2 depicts schematically the structure of a multiuser DS-CDMA receiver using a method of detection by spheres.

FIG. 2 depicts schematically a multiuser detection device using a method of detection by spheres. The received signal n is filtered by a battery of filters adapted to each of the users, $210_1, \ldots, 210_K$. The real and imaginary components of the observation vector $y_2(i)$ output from the adapted filters are transmitted to a matrix calculation unit performing the spectral whitening operation according to equation (14). The real and imaginary components of the whitened vector $\tilde{y}_2(i)$ are then transmitted to a unit for detection by spheres seeking the closest neighbour of the point received within the lattice $\Omega_2$ of dimension 2.K. The coordinates of the closest neighbour directly give the real and imaginary components of the estimated symbols $\hat{d}_k(i)$ for the different users.

It can be shown that the method of detection by spheres as disclosed above has a complexity in terms of $O(K^6)$ which may prove very disadvantageous when the number of users is high.

SUMMARY OF THE INVENTION

The aim of the present invention is to propose, under certain conditions, a simplification of the method of detection by spheres.

For this purpose, the invention is defined by a method of detecting a plurality of symbols ($d_k(i)$) transmitted by or for a plurality K of users, each symbol belonging to a modulation constellation and being the subject of a spectral spreading by a spreading sequence, the said method comprising a filtering step adapted for supplying a complex vector ($y(i)$, $\tilde{y}(i)$) characteristic of the said received signal$_1$, the said complex vector being decomposed into a first vector ($y^R(i)$, $\tilde{y}^R(i)$) and a second vector ($y^I(i)$, $\tilde{y}^I(i)$) and at least the closest neighbors of the first and second vectors being sought within a lattice of points ($\Lambda$, $\Omega$) generated by the said modulation constellations, the transmitted symbols being estimated from the components of the said closest neighbors.

Advantageously, the spreading sequences ($S_k(t)$) consist of real multiples ($S_k^0(t)$) of the same complex coefficient ($\sigma$).

According to one embodiment of the invention, the search is limited to a first set of points in the lattice belonging to a first predetermined zone ($\Sigma_R$) around the first vector and a second set of points in the lattice belonging to a second predetermined zone ($\Sigma_I$) around the second vector.

Likewise the search can be limited to a first set of points in the lattice belonging to a first predetermined zone ($\Sigma_R$) around the origin and a second set of points in the lattice belonging to a second predetermined zone ($\Sigma_I$) around the origin.

The said first and second predetermined zones are for example spheres.

Advantageously, the search for the closest neighbour of the first vector is carried out on a plurality of components of the latter, the search being limited for each of the said components to an interval defined by a lower band and an upper band, the said bands being chosen so that the said interval does not comprise any points relating to symbols which cannot belong to the modulation constellation.

Likewise the search for the closest neighbour of the second vector can be carried out on a plurality of components of the latter, the search being limited for each of the said components to an interval defined by a lower bound and an upper bound, the said bounds being chosen so that the said interval does not comprise any points relating to symbols which cannot belong to the modulation constellation.

Prior to the search for the closest neighbour, the first vector ($Y^R(i)$) is advantageously subjected to a matrix processing aimed at substantially decorrelating the different noise components thereof.

Likewise, prior to the search for the closest neighbour, the second vector ($y^I(i)$) can be subjected to a matrix processing aimed at substantially decorrelating the different noise components thereof.

According to a variant embodiment of the invention, the said search step is extended to a search for a first set of points which are closest neighbors of the said first vector, referred to as first neighbors, and to a second set of points which are closest neighbors of the said second vector, referred to as second neighbors, and the transmitted symbols are estimated flexibly from the symbols generating the said first and second neighbors and distances separating the said first neighbors of said first vector on the one hand and the said second neighbors of the said second vector on the other hand.

According to a particular embodiment of the invention, there are determined, from the estimated symbols, the contributions of each user to the signals obtained by the adapted filtering step and, for a given user k, the contributions of the other users corresponding to the symbols already estimated are eliminated at the output of the filtering step. Alternatively, the contributions of each user to the signal received from the estimated symbols are determined and, for a given user k, the contributions of the other users corresponding to the symbols already estimated are eliminated at the input of the adapted filtering stage.

If the symbols of the said K users are transmitted synchronously, the said lattice of points will preferably be of dimension K If the symbols of the said K users are transmitted asynchronously and propagate along a plurality of paths, the dimension of the lattice will preferably be equal to the number of symbols of the different users which may interfere and are not yet estimated.

The present invention is also defined by a device for detecting a plurality of symbols ($d_k(i)$) transmitted by or for a plurality K of users, each symbol belonging to a modulation constellation and being the subject of a spectral spreading by means of a spreading sequence, the device comprising means for implementing the method disclosed above.

This device can in particular be used in a receiver in a DS-CDMA mobile telecommunications system.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

The idea at the basis of the invention is to reduce the dimension of the lattice of points using spreading sequences of a particular type for the different users.

Consider once again a DS-CDMA telecommunication system with K synchronous users. If spreading sequences $s_k(t)$ with real values are chosen, the imaginary terms of the matrix $R_2$ and consequently of the matrix $M_2(i)$ are zero. Consequently, the system can be modelled by a lattice of real points $\Lambda$ of dimension K and generator matrix M(i):

$$y^R(i)=d^R(i)M(i)+n^R(i) \qquad (15)$$

$$y^I(i)=d^I(i)M(i)+n^I(i) \qquad (16)$$

where
$y^R(i)$, $d^R(i)$, $n^R(i)$ (or respectively $y^I(i)$, $d^I(i)$, $n^I(i)$) are the vectors consisting of the real parts (or respectively of the imaginary parts) of the components of y(i), d(i), n(i);

M(i)=AR(i) where R(i) is the matrix consisting of the coefficients $$R_{lk} = \int_0^T s_l(t)s_k(t)dt$$

and A is the vector of the amplitudes of the K users.

The observation vectors $y^R(i)$ and $y^I(i)$ belong to $R^K$. After any transformation according to an equation of the same type as (12), the vectors $y^R(i)$ and $y^I(i)$ can be considered to be points in a lattice $\Lambda$ of generator matrix M(i) corrupted by noise.

It can easily be shown that the noise vectors $n^R(i)$ and $n^I(i)$ both have the covariance matrix $N_0.R(i)$. R being a symmetrical matrix defined positive, it can be factorised according to a Cholesky decomposition: $R=WW^T$ where W is an inferior triangular real matrix of size K×K. In order to decorrelate the noise components, the real observation vectors $y^R(i)$ and $y^I(i)$ are first of all subjected to a whitening operation:

$$\tilde{y}^R(i)=y^R(i)W^{T^{-1}} \qquad (17)$$

$$\tilde{y}^I(i)=y^I(i)W^{T^{-1}} \qquad (18)$$

Secondly, the closest neighbors of the vectors $\tilde{y}^R(i)$ and $\tilde{y}^I(i)$ belonging to the lattice of points $\Omega$ consisting of the vectors $\tilde{x}(i)\times x(i)W^{T^{-1}}$ where x(i) belongs to $\Lambda$, are sought. It can easily be shown that, after whitening, the covariance matrices of the filtered noises $n^R(i)W^{T^{-1}}$ and $n^I(i)W^{T^{-1}}$ are both equal to $N_0 I_K$ where $I_K$ is the identity matrix of dimension K.

It can therefore be seen that using real signatures leads to a search for two closer neighbors in the same lattice of dimension K whilst in the general case, which is complex, the decoding requires a search in a lattice of dimension 2K. In fact it can easily be shown that the above result extends to any set of signatures carried by the same complex number, that is to say such that:

$$s_k(t) = \sigma \cdot s_k^0(t)$$

where $\sigma$ is a complex number and $$s_k^0(t)$$

is real. This will of course in particular be the case if all the signatures are imaginary.

Since the search for the closest neighbour for the vector $\tilde{y}^I(i)$ takes place according to the same principle as for $\tilde{y}^R(i)$, only the first will be disclosed. This search consists of determining the point x minimizing the metric:

$$m(\tilde{y}^R/x) = \sum_{i=1}^{K}|\tilde{y}_i^R - x_i|^2 = \|\tilde{y}^R - x\|^2 \qquad (19)$$

where $\tilde{y}^R=x+n^R$ and $x=(x_1,\ldots,x_K)$ is a point belonging to the lattice $\Omega$.

Alternatively, it will be noted that the vector $y^R(i)$ does not need to be whitened if a metric is used based on the covariance matrix:

$$m(y^R/x) = (y^R - x)R^{-1}(y^R - x)^T \quad (20)$$

Hereinafter, for reasons of simplification, the observation vector, whitened ($\tilde{y}^R(i)$) or not ($y^R(i)$), will be termed z and the metric acting in equation (19) or (20) will be termed $\|.\|$.

The points in the lattice $\Omega$ consist of the vectors x such that $x = bG$ where G is the generator matrix for the lattice and $b = (b_1, \ldots, b_\kappa)$, the components $b_i$ belong to the ring of integers Z.

The detector advantageously restricts its metric calculation to the points which are situated within a zone of the constellation situated around the received point, preferably within a sphere of given radius $\sqrt{C}$ centred on the received point z. Only the points in the lattice situated at a quadratic distance less than C from the received point are therefore considered for the minimization of the metric.

In practice, the decoder effects the following minimization:

$$\min_{x \in \Omega} \|z - x\| = \min_{w \in z - \Omega} \|w\| \quad (21)$$

To do this, the decoder seeks the smallest vector w in the translated set z–. The vectors z and w can be expressed as:

$$z = .G \text{ with } . = (\rho_1, \ldots, \rho_\kappa)$$

$$w = .G \text{ with } . = (\xi_1, \ldots, \xi_\kappa) \quad (22)$$

It is important to note that $\rho$ and $\xi$ are real vectors. As $w = z - x$, where x belongs to the lattice $\Omega$, this gives the equation $\xi_i = \rho_i - b_i$ for $i = 1, \ldots, \kappa$ with $$w = \sum_{i=1}^{\kappa} \xi_i v_i.$$

The vector w is a point in the lattice whose coordinates $\xi_i$ are expressed in the translated reference frame centred on the received point. The vector w belongs to a sphere of quadratic radius C centred at 0 if:

$$\|w\|^2 = Q(\xi) = \xi GG^T \xi^T \leq C \quad (23)$$

In the new system of coordinates defined by $\xi$, the sphere of quadratic radius C centred at y is therefore transformed into an ellipsoid centred on the origin. The Cholesky factorisation of the Gram matrix $\Gamma = GG^T$ gives $\Gamma = .^T$, where $\Delta$ is an inferior triangular matrix of elements $\delta_{ij}$.

It should be noted that, if the vector y has been whitened, it is not necessary to effect this factorisation since the generator matrix of $\Omega$ is equal to AW and is therefore already triangular and inferior. However, where prior whitening has not been carried out, Cholesky decomposition is necessary. In all cases, it is possible to write:

$$Q(\xi) = \xi \ldots^T \xi^T = \|.^T \xi^T\|^2 = \sum_{i=1}^{\kappa} \left( \delta_{ii} \xi_i + \sum_{j=i+1}^{\kappa} \delta_{ji} \xi_j \right)^2 \leq C \quad (24)$$

By putting $$q_{ii} = ._{ij}^2 \text{ for } i = 1, \ldots,.$$

$$q_{ij} = \frac{._{ij}}{._{jj}} \text{ for } j = 1, \ldots,.; \quad i = j+1, \ldots,.$$

there is obtained $$Q(\xi) = \sum_{i=1}^{\kappa} q_{ii} \left( \xi_i + \sum_{j=i+1}^{\kappa} q_{ji} \xi_j \right)^2 \quad (25)$$

By taking first of all the range of possible variations of $\xi_\kappa$, and then adding the components one by one, the following K inequalities are obtained, which define all the points within the ellipse:

$$q_{KK} \xi_K^2 \leq C \quad (26)$$

$$q_{K-1,K-1}(\xi_{K-1} + q_{K,K-1}\xi_K)^2 + q_{KK}\xi_K^2 \leq C$$

$$\forall l \in \{1; \kappa\}, \sum_{i=l}^{K} q_{ii} \left( \xi_i + \sum_{j=i+1}^{K} q_{ji}\xi_j \right)^2 \leq C$$

It can be shown that the inequalities (26) make it necessary for the integer components of b to satisfy:

$$\left\lceil -\sqrt{\frac{C}{q_{KK}}} + \rho_K \right\rceil \leq b_K \leq \left\lfloor \sqrt{\frac{C}{q_{KK}}} + \rho_K \right\rfloor \quad (27)$$

$$\left\lceil -\sqrt{\frac{C - q_{KK}\xi_K^2}{q_{K-1,K-1}}} + \rho_{K-1} + q_{K,K-1}\xi_K \right\rceil \leq$$

$$b_{K-1} \leq \left\lfloor -\sqrt{\frac{C - q_{KK}\xi_K^2}{q_{K-1,K-1}}} + \rho_{K-1} + q_{K,K-1}\xi_K \right\rfloor$$

$$\left\lceil -\sqrt{\frac{1}{q_{ii}}\left(C - \sum_{l=i+1}^{K} q_{ll}\left(\xi_l + \sum_{j=l+1}^{K} q_{jl}\xi_j\right)^2\right)} + \rho_i + \sum_{j=i+1}^{K} q_{ji}\xi_j \right\rceil \leq b_i$$

$$b_i \leq \left\lfloor \sqrt{\frac{1}{q_{ii}}\left(C - \sum_{l=i+1}^{K} q_{ll}\left(\xi_l + \sum_{j=l+1}^{K} q_{jl}\xi_j\right)^2\right)} + \rho_i + \sum_{j=i+1}^{K} q_{ji}\xi_j \right\rfloor$$

where $\lceil x \rceil$ is the smallest integer greater than the real number x and $\lfloor x \rfloor$ is the largest integer smaller than the real number x.

The decoder has K internal counters, namely one counter per dimension, each counter counting between a lower and upper bound as indicated in (27), given that each counter is associated with a particular pair of bounds. In practice these bounds can be updated recursively.

Advantageously, all the values of the vector b are listed for which the corresponding point in the lattice $x = bG$ is situated within the quadratic distance C from the received point. The points in the lattice situated outside the sphere in question are not tested. Advantageously, for each component $1, \ldots, K$ the upper and lower bounds of the search will be adjusted so as not to contain points which are certainly outside the constellation. Thus the counters do not waste any time in running over points which, in any event, are not solutions. For example, if all the users employ the same PAM modulation constellation of size M, the search bounds cannot leave the interval [0, M−1].

In addition, the search within the sphere can be considerably accelerated by updating the radius $\sqrt{C}$ with the last Euclidian norm calculated $\|w\|$. Finally, there is selected, as the best point x, the one associated with the smallest norm $\|w\|$.

So as to be sure that the decoder finds at least one point in the lattice, a search radius is advantageously chosen so as to be greater than the radius of coverage of the lattice. It can for example be taken so as to be equal to the upper Rogers bound:

$$\sqrt{C}^K = (K\log K + K\log\log K + 5K) \times \frac{|\det(G)|}{V_K} \quad (28)$$

where $V_K$ is the volume of a sphere of unity radius in the real space.

Figure 3:
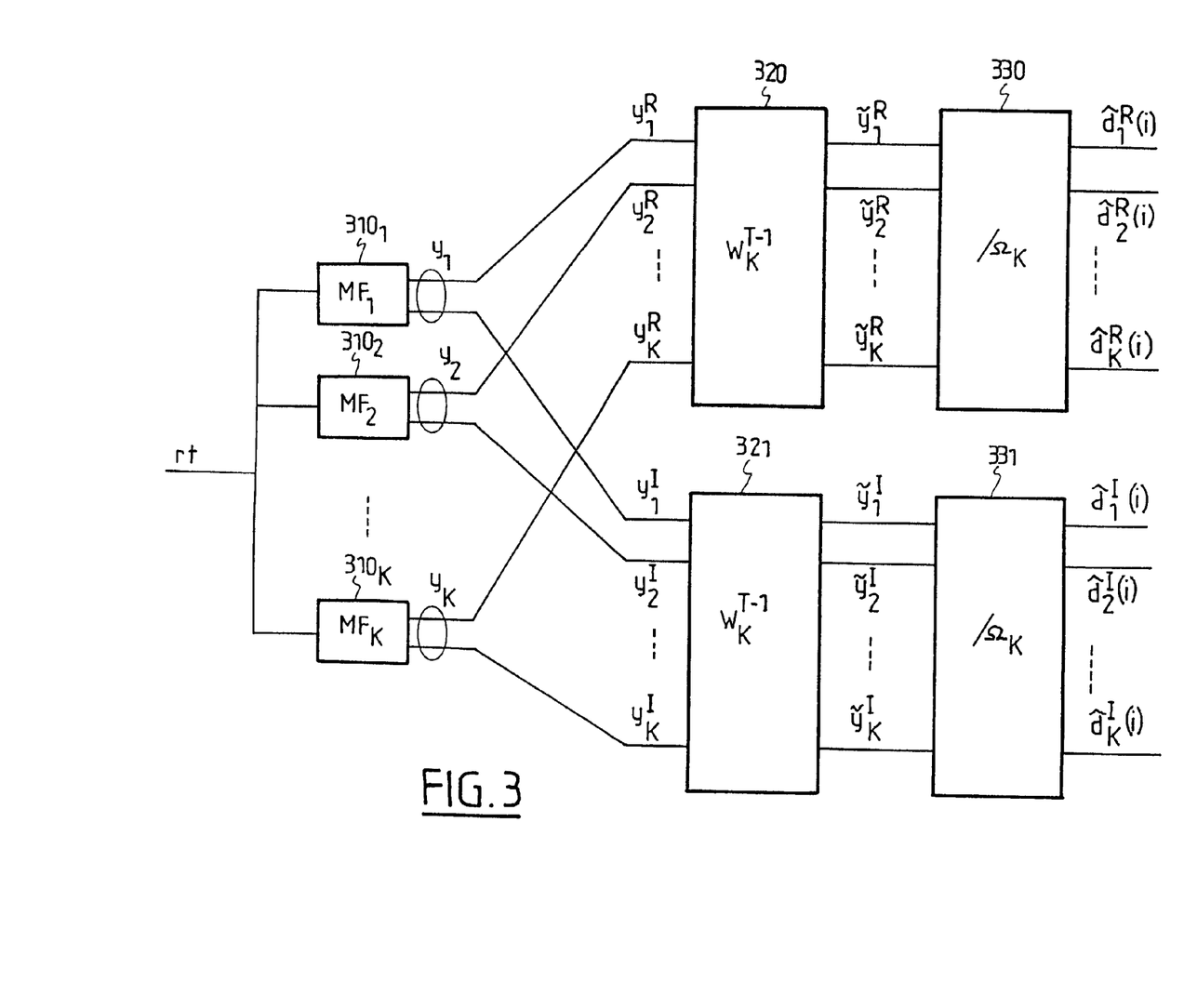
FIG. 3 depicts schematically the structure of a multiuser detection device according to a first embodiment of the invention.

FIG. 3 illustrates schematically a multiuser detection device according to a first embodiment of the invention. The received signal is first of all filtered by a battery of filters adapted to the different users, $310_1, \ldots, 310_K$. The observation vector output from the adapted filters is decomposed into a real observation vector $y^R(i)=(y_1^R(i), \ldots, y_K^R(i))$ and an imaginary observation vector $y^I(i)=(y_1^I(i), \ldots, y_K^I(i))$. After any transformation of the type at (12) (not shown), the vectors $y^R(i)$ and $y^I(i)$ undergo a spectral whitening at 320 and 321 in order to decorrelate the noise samples. The whitened vectors $\tilde{y}^R(i)$ and $\tilde{y}^I(i)$ are then the subject of a search for the closest neighbour as described above in the detectors by spheres 330 and 331. The point found by the detector 330 gives (by means if necessary of a transformation which is the reverse of that of (12)) the real components of the symbols estimated for the K users. Likewise, the detector 331 gives the imaginary components of these estimated symbols.

Instead of directly supplying symbols of the constellation, the receiver can be adapted to supply symbols in the form of flexible decisions. In this case, the search within the detection sphere is no longer limited to the closest neighbour but is extended to a plurality of the closest neighbors of the point relating to the received signal.

More precisely, let $\xi_R$ and $\xi_I$ be the spheres centred respectively around $\tilde{y}^R(i)$ and $\tilde{y}^I(i)$. There is associated with any pair $d^{m,m'}(i)=(v_m, v_{m'})$ of neighboring points belonging to $(\xi_R, \xi_I)$ such that the K components $d_k^{m,m'}(i)$ belong to the modulation constellations of the users, an a posterior probability $p^{m,m'}$, a probability that the vector $d_k^{m,m'}(i)$ defined by this point has been sent, given the observation $\tilde{y}(i)$. Let $\Theta$ be the set of these pairs. A flexible symbol of a user k is defined as the $M_k$-tuplet $(\pi_1, \ldots, \pi_{Mk})$ where $M_k$ is the cardinal of the modulation constellation of the user k and where $\pi_j$ is the probability that the symbol $s_j$ has been sent. This gives:

$$\pi_j = p(s_j/\tilde{y}) = \sum_{(v_m,v_{m'})\in\Theta} p(s_j/d_k^{m,m'}) \cdot p^{m,m'} \quad (29)$$

The a posterior probabilities $p^{m,m'}$ can for example be expressed as a function of the distances $\lambda_m$ and $\lambda_{m'}$ separating the vectors $\tilde{y}^R(i)$ and $\tilde{y}^I(i)$ from $v_m$ and $v_{m'}$.

Equation (2) presupposed that the signals of the different users were synchronous. When this assumption is not valid, the spread symbol of a user k at a given instant may interfere with two successive spread symbols of another user k'. If it is assumed that the scattering of the transmission delays $\tau_k$ of the different users is less than a symbol period T, the symbol of a user k sent at an instant i, $d_k(i)$, may interfere with the symbols $d_{k'}(i-1)$ and $d_{k'}(i+1)$ of a user k'. It can be assumed without loss of generality that $0 \leq \tau_1 \leq \ldots \leq \tau_k \leq \ldots \leq \tau_K \leq T$. After the symbols $d_k(i-1)$ for all the users k=1 ... K are detected, the detection is commenced of the symbols relating to the instant i commencing with the earliest user (here the user 1) and finishing with the latest user (here the user K). The detection of $d_k(i)$ depends on three vectors: the vector $d_P=(d_1(i), \ldots, d_{k-1}(i), d_k(i-1), d_{k+1}(i-1), \ldots, d_K(i-1))$ relating to the symbols already detected, the vector $d_F=(d_1(i+1), \ldots, d_{k-1}(i+1), d_k(i), d_{k+1}(i), \ldots, d_K(i))$ relating to future symbols and the observation vector y(i). It can be shown that the complex observation vector can be written in the form of a past contribution and a future contribution:

$$y=d_P A R_P + d_F A R_F + n \quad (30)$$

where n is a noise vector of covariance matrix $N_0 R_F$, and $R_P$ and $R_F$ are respectively the matrix of correlation of the signatures with the passed signatures and the matrix of correlation of the signatures with the future signatures.

When the signatures are of the real value type (or more generally are real multiples of the same complex number) equation (30) can be decomposed in the form of two equations involving only real vectors, in a similar manner to equations (15) and (16):

$$y^R = d_P^R A R_P + d_F^R A R_F + n^R \quad (31)$$

$$y^I = d_P^I A R_P + d_F^I A R_F + n^I \quad (32)$$

Instead of effecting the detection by spheres on the observation vectors $y^R$ and $y^I$, this will operate on the vectors freed of any interference due to the passed symbols already estimated, namely: $y^R - \hat{d}_P^R A R_P$ and $y^I - \hat{d}_P^I A R_P$.

Alternatively, instead of carrying out the subtractive elimination of the interference at the level of the observation vector, this elimination can be envisaged in an equivalent manner, upstream, on the spread of signals. The estimated symbols are respread spectrally and the contributions of the different users to the received signal are subtracted one by one, on the fly (as they are respread), at the input of the adapted filters. The inputs of the adapted filters will therefore receive the signals cleaned of the passed contributions, namely $n-I_k(t)$ where:

$$I_k(t) = \sum_{k'<k} a_{k'} \hat{d}_{k'}(i) s_{k'}(t-iT-\tau_{k'}) + \quad (33)$$
$$\sum_{k'>k} a_{k'} \hat{d}_{k'}(i-1) s_{k'}(t-(i-1)T-\tau_{k'})$$

The first right-hand term in equation (33) represents the contribution of the users which are in advance on the user k and for which consequently an estimation of the symbols $\hat{d}_{k'}(i)$ is already available. The second term represents the contributions of the users which are behind with respect to the user k: the contribution due to the symbols $\hat{d}_{k'}(i)$ can of course not be evaluated at the time when the symbol $d_k(i)$ is despread. On the other hand, the contribution due to the previous symbols $d_{k'}(i-1)$ can be evaluated since an estimation of the symbols $\hat{d}_{k'}(i-1)$ is already available.

It is important to note that, unlike the synchronous case where the step of detection by spheres estimated only all the symbols $d_k(i)$, in the asynchronous case the symbols of the different users are estimated one after the other in their order of arrival.

Figure 4:
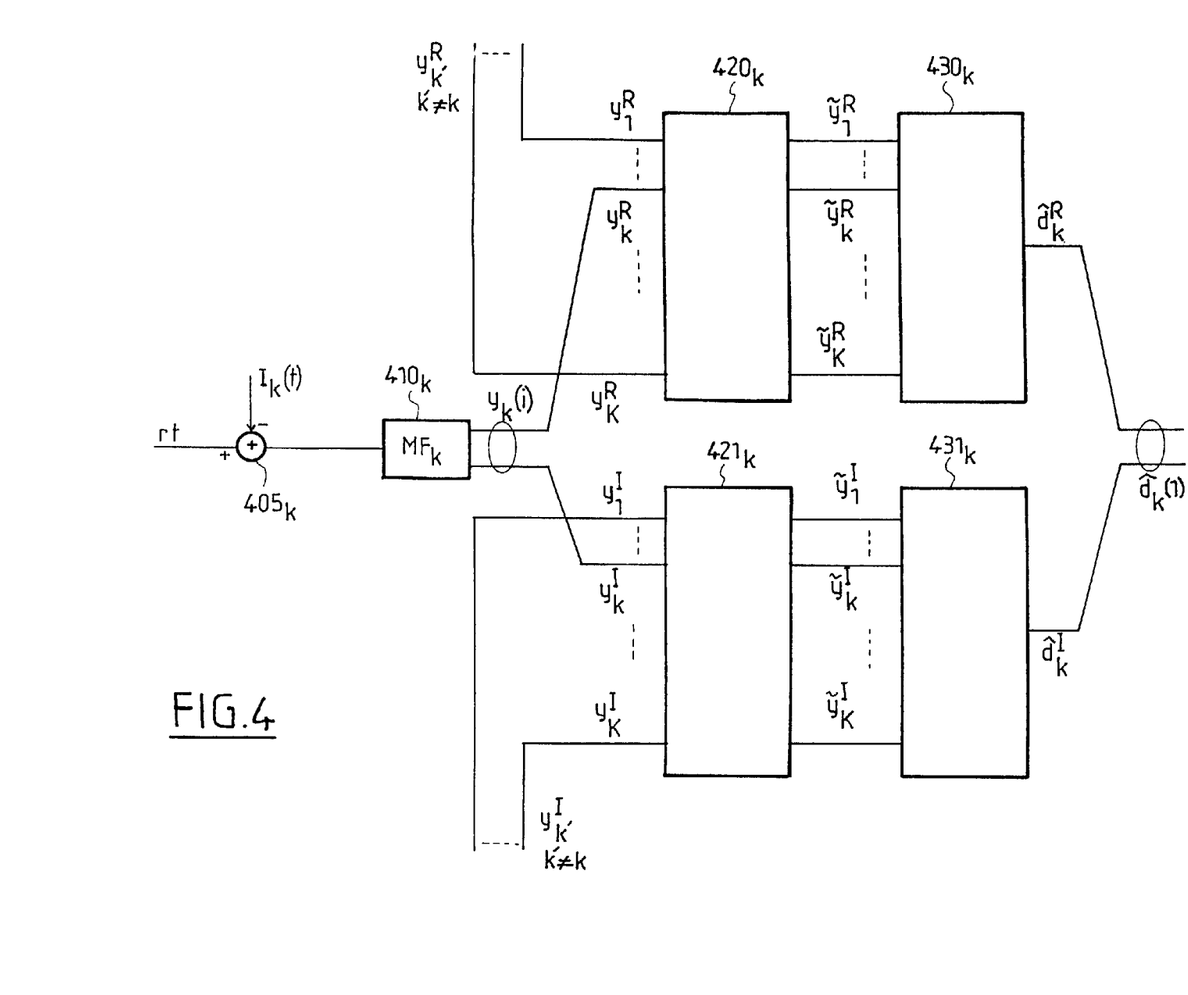
FIG. 4 depicts schematically the structure of a multiuser detection device according to a second embodiment of the invention.

FIG. 4 illustrates a second embodiment of the invention implementing a subtractive elimination of the interference for asynchronous users. To simplify the representation, only the detection branch concerning a user k has been illustrated. The sum $I_k(t)$ symbolizes the sum of the contributions of the other users and is subtracted at $405_k$ from the signal $r_t$ input from the adapted filter $410_k$. The detection by spheres for the user k starts at the instant when the symbol $d_k(i)$ is despread. It should be noted that, at this instant, the interfering symbols not yet estimated of the other users will have been subject only to a partial despreading (except of course if the interfering symbols are synchronous). The module $430_k$ (or respectively $431_k$) operates on the components output from $420_k$ (or respectively $421_k$). Alternatively the outputs of all the modules $430_k$ (or respectively $431_k$) can be demultiplexed in order to be processed by a common module 440 working K times more rapidly. Unlike FIG. 3, here only the $k^{th}$ output of the modules $430_k$ and $431_k$ is used for supplying the estimated symbol $d_k(i)$. The symbol $d_k(i)$ is then respread and the contribution $a_k d_k(i) s_k(t-iT-\tau_k))$ of the user k is evaluated and then subtracted at the input of the adapted filters $410_k$ via $I_k(t)$.

If the transmission channels of the different users are of the multipath type, the problem of the elimination of interference is more complex since it is necessary to consider the interference between all the paths of all the users. The received signal can be written:

$$n = \sum_{i=0}^{N-1} \sum_{k=1}^{K} \sum_{p=1}^{P_k} a_k c_{pk} d_k(i) s_k(t - iT - \tau_{pk}) + \eta_{pk}(t) \quad (34)$$

where $P_k$ is the number of parts of the transmission channel of the user k, $\tau_{pk} = \tau_k + \theta_{pk}$ is the total delay of the delay ($\tau_k$) on transmission of the user k and the delay ($\theta_{pk}$) of propagation along the path p of the channel k and $c_{pk}$ is the complex multiplicative factor associated with this path. It will be assumed once again that $0 \leq \tau_1 \leq \ldots \leq \tau_k \leq \ldots \leq \xi_K < T$ and that in addition the scattering of the paths is less than the symbol period: $0 \leq \theta_{pk} < T$. As a result $0 \leq \tau_k < 2T$.

The adapted filters $410_k$ then effect a filtering adapted to the signature of the user k and to the transmission channel k by MRC (Maximum Ratio Combining) of the signals of the different paths. More precisely, the filter $310_k$ performs the following operation:

$$y_k(i) \triangleq \sum_{p=1}^{P_k} c_{pk}^* \int_{-\infty}^{+\infty} s_k^*(t - iT - \tau_{pk}) n \, dt \quad (35)$$

Because of the scattering of the delays, the duration to be taken into account for the interference between users is 2T and the symbol of a user can interfere with two consecutive symbols, not yet estimated, of another user. The conjoint detection then relates to all the interfering symbols which have not yet been estimated, the estimated interfering symbols for their part being used for the subtractive elimination. The complexity of the detector by spheres is higher than in the single-path asynchronous case since the dimension of the lattice to be taken into account is 2K-1 instead of K.

Figure 5:
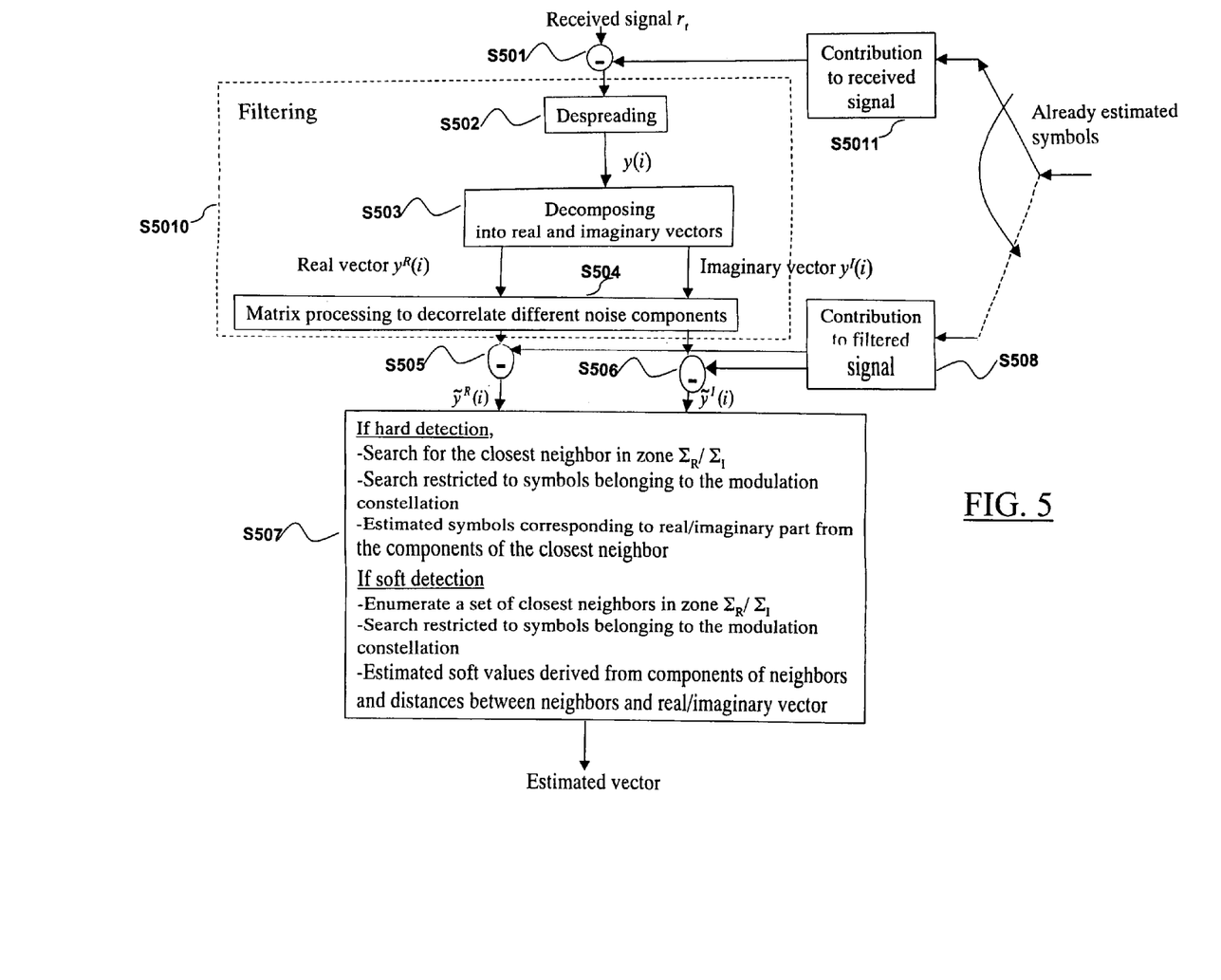
FIG. 5 is a flowchart corresponding to a method according to an embodiment of the invention.

FIG. 5 is a flow chart of an embodiment of the present invention. In step 501 a received signal $r_t$ and an already estimated signal received in step 5011 are subtracted. The subtracted signal is despread in step 502 of the filtering process 5010. The despread signal is decomposed into real and imaginary vectors in step 503. The real and imaginary vectors are matrix processed in step 504 to decorrelate different noise components. A symbol estimated in step 508 is subtracted from the matrix processed real and imaginary signals in steps 505 and 506. Either a hard or soft detection process is applied to the resulting real and imaginary symbols in step 507. If a hard detection is used in step 507, the process includes searching for the closest neighbor in zone $\Sigma_R/\Sigma_I$. The search is restricted to symbols belonging to the modulation constellation. Estimated symbols corresponding to real and imaginary parts of the components of the closest neighbor are obtained. If a soft detection process is used in step 507, a set of the closest neighbors in zone $\Sigma_R/\Sigma_I$ is enumerated. The search is restricted to symbols belonging to the modulation constellation. Estimated soft values are derived from components of neighbors, distances between neighbors and corresponding real/imaginary vectors. The hard or soft detection of step 507 results in an estimated vector.

Finally, it should also be noted that the estimation of the interfering contributions in the single-path or multi-path asynchronous case may be effected either from constellation symbols (hard decisions) or from the flexible symbols of the different users.

Although certain embodiments of the invention have been depicted in the form of functional modules, it is clear that the device according to the invention can be produced in the form of a processor programmed for executing the different functions depicted or in the form of a plurality of dedicated processors able to implement one or more of these functions.

The invention claimed is:

1. A method of processing a received signal, comprising:
   detecting within said received signal a plurality of possible symbols ($d_k(i)$) transmitted by or for a plurality K of users, each of the plurality of possible symbols belonging to a modulation constellation and being the subject of a spectral spreading by a spreading sequence ($s_k(t)$), said step of detecting comprising substeps of:
   filtering said received signal, said filtering step adapted for supplying a complex vector characteristic of said received signal, and including decomposing said complex vector into a real vector ($y^R(i)$) and an imaginary vector ($y^I(i)$);
   searching separately for at least a closest neighbor of the real vector and a closest neighbor of the imaginary vector within a respective real and imaginary lattice of points ($\Lambda$, $\Omega$) corresponding to said modulation constellation; and
   estimating the transmitted symbols from components of said closest neighbor of the real vector and the closest neighbor of the imaginary vector so as to produce a vector of estimated symbols,
   wherein the step of searching is limited to a first set of points in the real lattice belonging to a first predetermined zone ($\Sigma_R$) around the real vector and a second set of points in the imaginary lattice belonging to a second predetermined zone ($\Sigma_I$) around the imaginary vector.

2. The method according to claim 1, wherein the spreading sequence ($s_k(t)$) consist of real multiples ($s_k^0(t)$) of a corresponding complex coefficient ($\sigma$).

3. The method according to claim 1, wherein said first and second predetermined zones ($\Sigma_R$ and $\Sigma_I$) are spheres of probability.

4. The method according to claim 1, wherein, prior to the search for the closest neighbor of the real vector, the real vector ($y^R(i)$) is subjected to a matrix processing to substantially decorrelate different noise components thereof.

5. The method according to claim 1, wherein, prior to the search for the closest neighbor of the imaginary vector, the imaginary vector ($y^I(i)$) is subjected to a matrix processing to substantially decorrelate different noise components thereof.

6. The method according to claim 1, wherein contributions of each user to the received signal obtained by the filtering step are determined from the estimated symbol and in that, for a given user k, contributions of other users to the received signal corresponding to transmitted symbols already estimated are eliminated after the filtering step.

7. The method according to claim 1, wherein contributions of each user to the received signal are determined from the estimated symbol and in that, for a given user k, contributions of other users to the received signal corresponding to transmitted symbols already estimated are eliminated before the filtering step.

8. The method according to claim 1, wherein, the symbols of said K users are transmitted synchronously, and said lattice of points is of dimension K.

9. The method according to claim 6, wherein, the symbols of said K users are transmitted asynchronously and propagated along a plurality of paths, and a dimension of the lattice is equal to a number of symbols of the different users which are mathematically possible interfering symbols and are not yet estimated.

10. A method of processing a received signal, comprising:
detecting within said received signal a plurality of possible symbols ($d_k(i)$) transmitted by or for a plurality K of users, each of the plurality of possible symbols belonging to a modulation constellation and being the subject of a spectral spreading by a spreading sequence ($s_k(t)$), said step of detecting comprising substeps of:
filtering said received signal, said filtering step adapted for supplying a complex vector characteristic of said received signal, and including decomposing said complex vector into a real vector ($y^R(i)$) and an imaginary vector ($y^I(i)$);
searching separately for at least a closest neighbor of the real vector and a closest neighbor of the imaginary vector within a respective real and imaginary lattice of points ($\Lambda$, $\Omega$) corresponding to said modulation constellation; and
estimating the transmitted symbols from components of said closest neighbor of the real vector and the closest neighbor of the imaginary vector so as to produce a vector of estimated symbols,
wherein the step of searching is limited to a first set of points in the real lattice belonging to a first predetermined zone ($\Sigma_R$) around the origin and a second set of points in the imaginary lattice belonging to a second predetermined zone ($\Sigma_I$) around the origin.

11. A method of processing a received signal, comprising:
detecting within said received signal a plurality of possible symbols ($d_k(i)$) transmitted by or for a plurality K of users, each of the plurality of possible symbols belonging to a modulation constellation and being the subject of a spectral spreading by a spreading sequence ($s_k(t)$), said step of detecting comprising substeps of:
filtering said received signal, said filtering step adapted for supplying a complex vector characteristic of said received signal, and including decomposing said complex vector into a real vector ($y^R(i)$) and an imaginary vector ($y^I(i)$);
searching separately for at least a closest neighbor of the real vector and a closest neighbor of the imaginary vector within a respective real and imaginary lattice of points ($\Lambda$, $\Omega$) corresponding to said modulation constellation; and
estimating the transmitted symbols from components of said closest neighbor of the real vector and the closest neighbor of the imaginary vector so as to produce a vector of estimated symbols,
wherein the step of searching closest neighbor of the real vector includes searching a plurality of components thereof, the searching of the plurality of components being limited for each of said components to an interval defined for a lower bound and an upper bound, said upper and lower bounds being chosen so that said interval excludes points relating to symbols which mathematically cannot belong to the modulation constellation.

12. A method of processing a received signal, comprising:
detecting within said received signal a plurality of possible symbols ($d_k(i)$) transmitted by or for a plurality K of users, each of the plurality of possible symbols belonging to a modulation constellation and being the subject of a spectral spreading by a spreading sequence ($s_k(t)$), said step of detecting comprising substeps of:
filtering said received signal, said filtering step adapted for supplying a complex vector characteristic of said received signal, and including decomposing said complex vector into a real vector ($y^R(i)$) and an imaginary vector ($y^I(i)$);
searching separately for at least a closest neighbor of the real vector and a closest neighbor of the imaginary vector within a respective real and imaginary lattice of points ($\Lambda$, $\Omega$) corresponding to said modulation constellation; and
estimating the transmitted symbols from components of said closest neighbor of the real vector and the closest neighbor of the imaginary vector so as to produce a vector of estimated symbols,
wherein the step of searching for the closest neighbor of the imaginary vector includes searching a plurality of components thereof, the searching a plurality of components being limited for each of said components to an interval defined for a lower bound and an upper bound, said upper and lower bounds being chosen so that said interval excludes points relating to symbols which mathematically cannot belong to the modulation constellation.

13. A method of processing a received signal, comprising:
detecting within said received signal a plurality of possible symbols ($d_k(i)$) transmitted by or for a plurality K of users, each of the plurality of possible symbols belonging to a modulation constellation and being the subject of a spectral spreading by a spreading sequence ($s_k(t)$), said step of detecting comprising substeps of:
filtering said received signal, said filtering step adapted for supplying a complex vector characteristic of said received signal, and including decomposing said complex vector into a real vector ($y^R(i)$) and an imaginary vector ($y^I(i)$);
searching separately for at least a closest neighbor of the real vector and a closest neighbor of the imaginary vector within a respective real and imaginary lattice of points (Λ, Ω) corresponding to said modulation constellation; and estimating the transmitted symbols from components of said closest neighbor of the real vector and the closest neighbor of the imaginary vector so as to produce a vector of estimated symbols, wherein said step of searching includes searching for a first set of points which are closest to said real vector and searching for a second set of points which are closest to said imaginary vector and in that the transmitted symbols are estimated via a soft detection from symbols corresponding to said first and second sets, and a first set of distances separating points of said first set from said real vector and a second distance set of distances separating points of said second set from said imaginary vector.

14. A communication device, comprising:

a processor configured to implement the method recited in any one of claims 2-9.

15. A receiver for a DS-CDMA mobile telecommunication system comprising the communication device recited in claim 14.

* * * * *